(12) United States Patent
Joo (10) Patent No.: US 10,906,264 B2
(45) Date of Patent: Feb. 2, 2021

(54) FOLDABLE HONEYCOMB STRUCTURE AND MANUFACTURING METHOD THEREOF

(71) Applicant: CHEMCORE CO., LTD, Daegu (KR)

(72) Inventor: Duok Ki Joo, Seoul (KR)

(73) Assignee: CHEMCORE CO., LTD, Daegu (KR)

( * ) Notice: Subject to any disclaimer, the term of this patent is extended or adjusted under 35 U.S.C. 154(b) by 92 days.

(21) Appl. No.: 16/078,948

(22) PCT Filed: Mar. 9, 2017

(86) PCT No.: PCT/KR2017/002561
§ 371 (c)(1),
(2) Date: Aug. 22, 2018

(87) PCT Pub. No.: WO2017/160022
PCT Pub. Date: Sep. 21, 2017

(65) Prior Publication Data
US 2019/0047245 A1    Feb. 14, 2019

(30) Foreign Application Priority Data

Mar. 14, 2016 (KR) .................. 10-2016-0030451

(51) Int. Cl.
| | | |
|---|---|---|
| *B32B 3/12* | (2006.01) | |
| *B32B 37/14* | (2006.01) | |
| *B32B 3/06* | (2006.01) | |
| *B32B 38/00* | (2006.01) | |

(52) U.S. Cl.
CPC .............. *B32B 3/12* (2013.01); *B32B 3/06* (2013.01); *B32B 37/14* (2013.01); *B32B 37/146* (2013.01); *B32B 38/0004* (2013.01); *B32B 2305/024* (2013.01)

(58) Field of Classification Search
CPC ......................................................... B32B 3/12
USPC ......................................................... 428/101
See application file for complete search history.

(56) References Cited

U.S. PATENT DOCUMENTS

2016/0039164 A1* 2/2016 Tuczek .................. E04C 2/326
428/57

FOREIGN PATENT DOCUMENTS

| JP | 11-509488 A | 8/1999 |
| JP | 2008-505788 A | 2/2008 |
| JP | 2008-520456 A | 6/2008 |
| JP | 2015-504799 A | 2/2015 |
| KR | 10-0779266 B1 | 11/2007 |

* cited by examiner

*Primary Examiner* — Brent T O'Hern
(74) *Attorney, Agent, or Firm* — Heedong Chae; Lucem, PC (57) ABSTRACT

The present disclosure relates to a foldable honeycomb structure widely used as an industrial material, a landscape material, and a building material, and a manufacturing method therefor. More specifically, the present disclosure relates to a foldable honeycomb structure and a manufacturing method therefor, wherein a foldable honeycomb structure capable of being folded and unfolded is easily produced using a readily foldable film or sheet made of a plastic material, paper, a metal material, or a non-metal material, instead of prior art molding or extrusion methods.

9 Claims, 6 Drawing Sheets

Step S1: a step for preparing a raw material mixture for forming a honeycomb structure substrate;

Step S2: a step for preparing a honeycomb structure substrate in the shape of a film or a sheet having a thickness of 0.1 to 3.0 mm by melt processing the raw material mixture for forming a honeycomb structure substrate;

Step S3: a step for attaching a functional material such as a non-woven fabric or felt, a glass fiber sheet or a glass fiber composite sheet, or a film or a sheet onto one surface or both surfaces of the honeycomb structure substrate;

Step S4: a step for forming longitudinal hinge parts having a thickness of 0.05 to 0.3 mm on the surface and the rear surface of the honeycomb structure substrate by pressing the honeycomb structure substrate with a hinge roll provided with a longitudinal hinge;

Step S5: a step for forming traverse hinge parts having a thickness of 0.05 to 0.3 mm and cut parts by pressing the substrate, on which the longitudinal hinge parts having a thickness of 0.05 to 0.3 mm are formed, with a honeycomb structure height hinge producing roll;

Step S6: a step for joining honeycomb structure joint parts by joining the upper portions of surface joint parts and rear surface joint parts on the surface and the rear surface of the substrate by a method selected from fusion, adhesion, cohesion, high-frequency and ultrasonic methods, while folding the honeycomb structure substrate in the longitudinal direction such that the groove portions of the hinges face outwards;

Step S7: a step for finishing a foldable honeycomb structure by cutting and laminating the honeycomb structure, which is joined at the honeycomb structure joint parts and folded in the longitudinal direction, into an appropriate size, and then drawing the same;

FIG. 9

Step S1: the step for preparing the raw material mixture for forming a honeycomb structure substrate;

Step S2: the step for preparing a honeycomb structure substrate in the shape of a film or a sheet having a thickness of 0.1 to 3.0 mm by melt processing the raw material mixture for forming a honeycomb structure substrate;

Step S3: the step for attaching a functional material such as a non-woven fabric or felt, a glass fiber sheet or a glass fiber composite sheet, or a film or a sheet onto one surface or both surfaces of the honeycomb structure substrate;

Step S51: a step for forming traverse hinge parts, which are 0.1 to 0.6 mm higher than the actual honeycomb structure height, twice the hinge thickness, by pressing the honeycomb structure substrate with a honeycomb structure height hinge producing roll;

Step S61: a step for producing a honeycomb structure, in which a middle portion is joined at the same height as the actual production height of the honeycomb structure and cut parts are provided, by joining honeycomb structure joint parts by joining the upper portions of surface joint parts and rear surface joint parts on the surface and the rear surface of the substrate by a method selected from fusion, adhesion, cohesion, high-frequency and ultrasonic methods, while folding the honeycomb structure substrate in the longitudinal direction, and then removing the height formed on the upper and lower portions of the substrate by 0.05 to 0.3 mm;

Step S71: a step for finishing a foldable wave-shaped honeycomb structure by cutting and laminating the honeycomb structure into an appropriate size, and then drawing the same;

FOLDABLE HONEYCOMB STRUCTURE AND MANUFACTURING METHOD THEREOF

CROSS-REFERENCE TO RELATED APPLICATION

This application claims the benefit of Korean Application No. 10-2016-0030451, filed on Mar. 14, 2016 with the Korean Intellectual Property Office, the disclosure of which is incorporated herein by reference.

TECHNICAL FIELD

The present disclosure relates to a foldable honeycomb structure, which is used as a building material or an automobile material, an industrial material and a landscape material, and a manufacturing method thereof and, more particularly, to a foldable honeycomb structure and a manufacturing method thereof, in which a foldable honeycomb structure capable of being folded and unfolded is easily produced using a rigid and easily foldable film or sheet made of plastic or paper, metal, or non-metal material, instead of using the prior art molding or extrusion method.

Particularly, compared with the honeycomb structure produced by the prior art molding or extrusion method, the present disclosure relates to a foldable honeycomb structure and a manufacturing method thereof, in which productivity and workability are remarkably increased by a folding method, in which a film or a sheet is folded and unfolded, the hexagonal shape of the honeycomb structure may be variously changed by changing the length of drawing depending on use when unfolding the honeycomb structure, the honeycomb structure is easy to transport and store, the manufacturing cost and transportation cost thereof can be greatly reduced, the honeycomb structure cell height can be readily adjusted during the mass production of the honeycomb structure, thick honeycomb structure having a thickness of 3.0 mm or more can be manufactured, the foldable honeycomb structure can be produced by using a plastic resin material made of a thermoplastic resin material such as polypropylene, polyethylene, ABS, PET and vinyl chloride resin or a thermosetting resin material such as phenol resin, epoxy resin and polyurethane resin, or by using a composite resin material made by adding a functional material such as natural fiber or additives for reinforcing the functional physical properties such as rigidity, flame resistance, impact resistance and the like, and the foldable honeycomb structure can be simply manufactured by using a commercially available film or sheet by using simple equipment and a mold or by CNC processing.

BACKGROUND ART

Hereinafter, the background art of the present disclosure will be described. One of the background art of the present disclosure is disclosed in Korean Patent Registration Publication No. 10-0779266 (registered on 19 Nov. 2007) entitled "lightweight plate material and manufacturing method thereof", on which basis the background art and further problems of the prior art will be described hereinafter.

Figure 1:
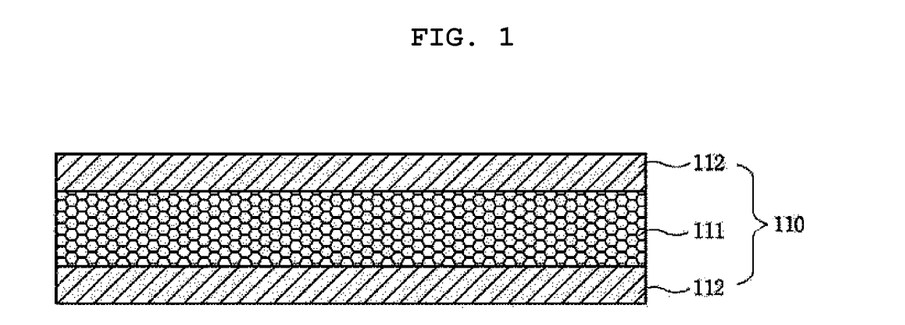
FIG. 1 is a cross-sectional view showing the prior art honeycomb structure used as a vehicle interior material.

Referring to FIG. 1, a substrate normally used for a vehicle material includes a honeycomb structure 111 and various laminate materials 112 formed on the both side surfaces of the honeycomb structure 111.

The substrate 110 has a disadvantage in that shape forming is difficult due to the characteristics of the honeycomb structure 111 and thus the honeycomb structure 111 can be limitedly used only for a simple shape structure such as a luggage mat or a luggage board. In addition, when a heavy material is used as the laminate material 112, the fuel efficiency of the vehicle becomes decreased. If a non-woven fabric is used as the laminate material 112 in order to solve the fuel efficiency reduction problem, there is another problem in that the stability of the shape cannot be secured.

Meanwhile, there is another prior art substrate used for vehicle interior materials, wherein the substrate is formed by inserting a honeycomb structure as a cushioning material between boards made of polypropylene fiber and natural fiber. However, the substrate still has a disadvantage in that the board made of polypropylene fiber and natural fiber is a material that extrusion is required and thus should be extruded using any additional heat press.

In addition, such a substrate product should be manufactured by inserting the honeycomb structure into the upper layer of the board pressed by an additional heat press and then transferring the same to a next forming process.

In other words, this prior art substrate used for vehicle interior materials has still disadvantages in that existing molding equipment cannot be used in the manufacture of the board and thus the equipment investment cost is increased excessively and a skin material should be separately adhered using an adhesive and thus the product forming process becomes complicated.

In order to solve the above-mentioned problems, according to the prior art disclosed in Korean Patent Registration Publication No. 10-0779266 entitled "lightweight plate material and manufacturing method thereof", there is provided a structure, in which a substrate layer is made of a hollow structure material having voids therein such as a bubble sheet, a corrugated sheet, a honeycomb structure, or a plastic composite resin product, and a surface layer made of a plastic sheet and a rear surface layer made of a non-woven fabric are respectively laminated on the upper and lower portions of the substrate layer. According to the structure, a plate material molded by a molding machine is used and thus the weight of the plate material is light. Simultaneously, the required stiffness as an automotive interior material such as a luggage cover can be maintained, a bonding structure is robust and shape forming work can be easily carried out.

However, the prior art structure still has disadvantages as follows.

A honeycomb structure plate material to be used as an automobile interior material is formed by a molding method or an extrusion method in which extrusion is carried out in a cylindrical shape and then adhesion and section cutting are carried out.

Therefore, there is a problem that mass production is difficult due to a large amount of manual work so that productivity and workability are remarkably lowered and manufacturing cost is increased. Further, it is not possible to use various joining methods using heat, high frequency or ultrasonic welding since only adhesive and cohesive agents can be used. Due to the adhesion of circular extrusion objects, a lot of space is created, a large amount of the adhesive is used and an adhesive area is reduced, so that the adhesive force is significantly lowered and the adhesive strength is uneven.

In addition, the use of recycled plastics is limited so that the recycling of waste resources is decreased and the manufacturing cost is increased.

After production, a honeycomb structure cell cannot be adjusted so that the honeycomb structure cannot be produced in various shapes according to use. Besides, the honeycomb structure is transferred and stored in a finished state, incurring high transportation and storage costs.

The honeycomb structure cell height cannot be adjusted during the mass production of the honeycomb structure and a thick honeycomb structure having a thickness of 3.0 mm or more cannot be produced.

Further, there are restrictions on the use of fillers, it is not possible to produce the honeycomb structure by using a plastic resin material made of a thermoplastic resin material such as polypropylene, polyethylene, ABS, PET and vinyl chloride resin or a thermosetting resin material such as phenol resin, epoxy resin and polyurethane resin, or by using a composite resin material made by adding a functional material such as natural fiber or additives for reinforcing the functional physical properties such as rigidity, flame resistance, impact resistance and the like.

DISCLOSURE

Technical Problem

The disclosure has been made in view of the above circumstances and provides, as objectives and problems to be solved, a foldable honeycomb structure and a manufacturing method thereof, which have the following features, compared with the honeycomb structure produced by the prior art molding or extrusion method.

As for a foldable honeycomb structure and a manufacturing method thereof according to the present disclosure, productivity and workability can be remarkably increased by a folding method, in which a film or a sheet is folded and unfolded, the hexagonal shape of the honeycomb structure may be variously changed by changing the length of drawing depending on use when unfolding the honeycomb structure, the honeycomb structure is easy to transport and store, the manufacturing cost and transportation cost thereof can be greatly reduced, a thick honeycomb structure having a thickness of 3.0 mm or more can be manufactured, the foldable honeycomb structure can be produced by using a plastic resin material made of a thermoplastic resin material such as polypropylene, polyethylene, ABS, PET and vinyl chloride resin or a thermosetting resin material such as phenol resin, epoxy resin and polyurethane resin, or by using a composite resin material made by adding a functional material such as natural fiber or additives for reinforcing the functional physical properties such as rigidity, flame resistance, impact resistance and the like, the honeycomb structure cell height can be readily adjusted during the mass production of the honeycomb structure, and the foldable honeycomb structure can be simply manufactured by using a commercially available film or sheet by using simple equipment and a mold or by CNC processing.

Technical Solution

The problems to be solved mentioned above are solved by a foldable honeycomb structure and a manufacturing method thereof, in which a honeycomb structure can be easily produced in a folding manner so as to be folded and unfolded in the longitudinal direction by using a rigid and easily foldable film or sheet made of plastic, paper, metal, or non-metal materials.

Advantageous Effects

According to the foldable honeycomb structure and a manufacturing method thereof of the present disclosure, compared with the honeycomb structure produced by the prior art molding or extrusion method, productivity and workability can be remarkably increased by a folding method, in which a film or a sheet is folded and unfolded, the honeycomb structure is easy to transport and store, the manufacturing cost and transportation cost thereof can be greatly reduced, a thick honeycomb structure having a thickness of 3.0 mm or more can be manufactured, the foldable honeycomb structure can be produced by using a plastic resin material made of a thermoplastic resin material such as polypropylene, polyethylene, ABS, PET and vinyl chloride resin or a thermosetting resin material such as phenol resin, epoxy resin and polyurethane resin, or by using a composite resin material made by adding a functional material such as natural fiber or additives for reinforcing the functional physical properties such as rigidity, flame resistance, impact resistance and the like, the hexagonal shape of the honeycomb structure may be variously changed by changing the length of drawing depending on use when unfolding the honeycomb structure, the honeycomb structure cell height can be readily adjusted during the mass production of the honeycomb structure, and the foldable honeycomb structure can be simply manufactured by using a commercially available film or sheet by using simple equipment and a mold or by CNC processing.

DESCRIPTION OF DRAWINGS

FIG. 8 is a stepwise flowchart for illustrating a method for manufacturing a foldable honeycomb structure, according to an embodiment of the present disclosure; and FIG. 9 is a stepwise flowchart for illustrating a method for manufacturing a foldable honeycomb structure, according to another embodiment of the present disclosure.

BRIEF EXPLANATION OF REFERENCE SYMBOLS

100: foldable honeycomb structure according to the present disclosure
10, 10', 10": substrate
11: cut part
12: hinge part
121: surface hinge part
122: rear surface hinge part
13, 13': joint part
131: surface joint part
132: rear surface joint part
14: reinforcement part
141: surface concave and convex part
142: rear surface concave and convex part 20: functional material
110: prior art substrate
111: honeycomb structure
112: laminate material

BEST MODE FOR CARRYING OUT THE DISCLOSURE

Hereinafter, a foldable honeycomb structure and a manufacturing method thereof, according to the present disclosure, will be described in detail with reference to the accompanying drawings.

The present disclosure relates to a foldable honeycomb structure, which is widely used as a building material, an automotive material, an industrial material, or a gardening material, and a manufacturing method thereof: particularly, compared with the prior art honeycomb structure and the manufacturing method thereof, in which a honeycomb structure is formed by the molding or extrusion method of extruding materials in a cylindrical shape, adhering the same and then cutting the adhered materials into, a honeycomb structure is easily formed by a folding method, in which a film or a sheet serving as a substrate for forming a honeycomb structure is folded and then unfolded.

A foldable honeycomb structure 100 according to the present disclosure, comprises: a substrate 10 formed of one selected from a plastic material composed of a thermoplastic resin or a thermosetting resin which is rigid and easily foldable, or paper, metal, or non-metal materials; cut parts 11 formed at predetermined intervals in the traverse arrangement on the substrate 10 so as to form a honeycomb structure cell structure of the substrate, wherein the honeycomb structure cell structure is formed as the substrate 10 is unfolded in the longitudinal direction and then unfolded; hinge parts 12 respectively provided on a surface and a rear surface of the substrate 10, each including a surface hinge part 121 and a rear surface hinge part 122, which are composed of a traverse hinge for folding the substrate in the longitudinal direction and a longitudinal hinge for forming the cross-sectional area of the honeycomb structure; joint parts 13 including a surface joint part 131 and a rear surface joint part 132, which are respectively provided on the surface and the rear surface of the substrate 10 so as to be joined to portions where the surface and the rear surface of substrate are required; and reinforcement parts 14 including surface concave and convex parts 141 and rear surface concave and convex parts 142, which are provided on a side surface of the substrate 10 so as to reinforce the rigidity of the substrate.

Figure 2:
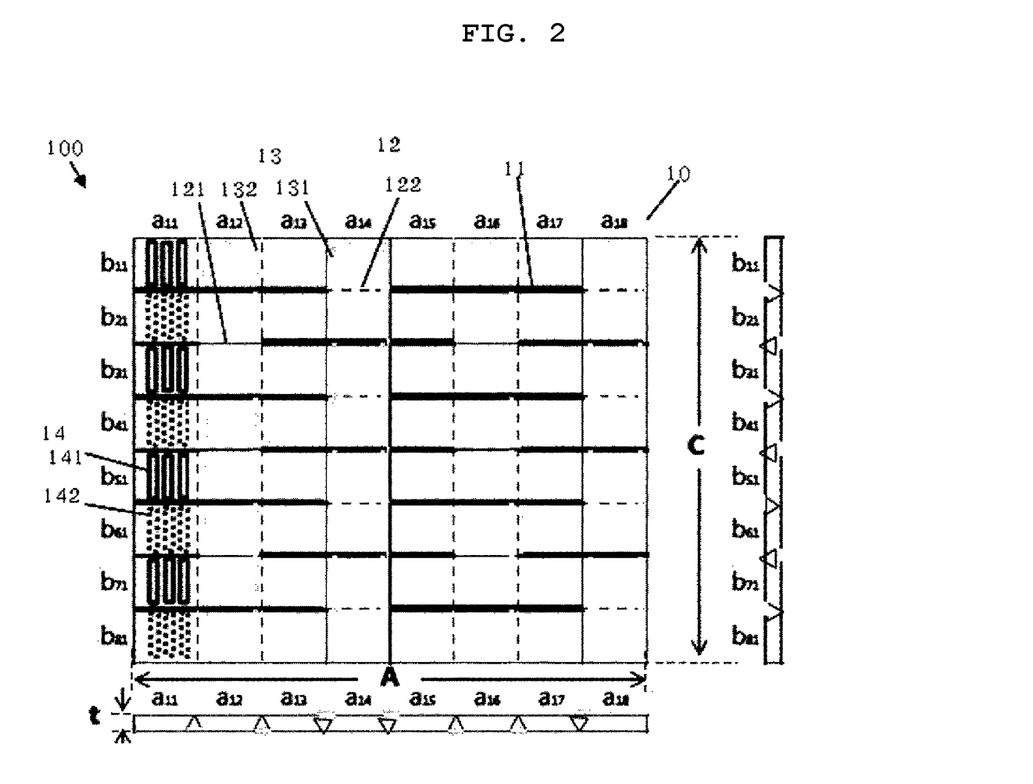
FIG. 2 is a cross-sectional view showing a foldable honeycomb structure according to an embodiment of the present disclosure.

FIG. 2 shows a development view in the case of manufacturing a hexagon-shaped honeycomb structure, which has a length "a" of one side and a height "b", with the substrates formed of one selected from plastic, paper, metal, or non-metal materials (for example, a paper sheet, an aluminum sheet, a metal sheet or a wooden sheet), which has a thickness of "t". In FIG. 2, the hinge structure of the substrate 10 is indicated by a solid black line, the hinge structure of the substrate rear surface is indicated by a dotted line, the cut (penetrated) part is indicated by a blue solid line, the substrate surface of the joint part (to be bonded or adhered or fused or assembled) is indicated by a yellow solid line, and the substrate rear surface is indicated by a yellow dotted line.

In addition, the substrate 10 is provided with longitudinal hinge parts, traverse hinge parts and cut parts, wherein every two hinge parts of the longitudinal direction are alternately provided on the surface and the rear surface of the substrate 10, which forms the cross-sectional area of the honeycomb structure, at a predetermined interval (a) of the traverse arrangement (longitudinal boundary surfaces a11 and a12 and the boundary surface between longitudinal boundary surfaces a12 and a13 are formed on the rear surface, longitudinal boundary surfaces a13 and a14 and the boundary surface between longitudinal boundary surfaces a14 and a15 are formed on the surface, longitudinal boundary surfaces a15 and a16 and the boundary surface between longitudinal boundary surfaces a16 and a17 are formed on the rear surface, and the boundary surface between longitudinal boundary surfaces a17 and a18 is formed on the surface); if the thickness of the substrate 10 is 0.3 mm or less and thus thin, the hinge parts 12 can be configured such that both the surface hinge part 121 and the rear surface hinge part 122 are formed on the surface of the substrate 10 or both the surface hinge part 121 and the rear surface hinge part 122 are formed on the rear surface of the substrate 10.

Figure 3:
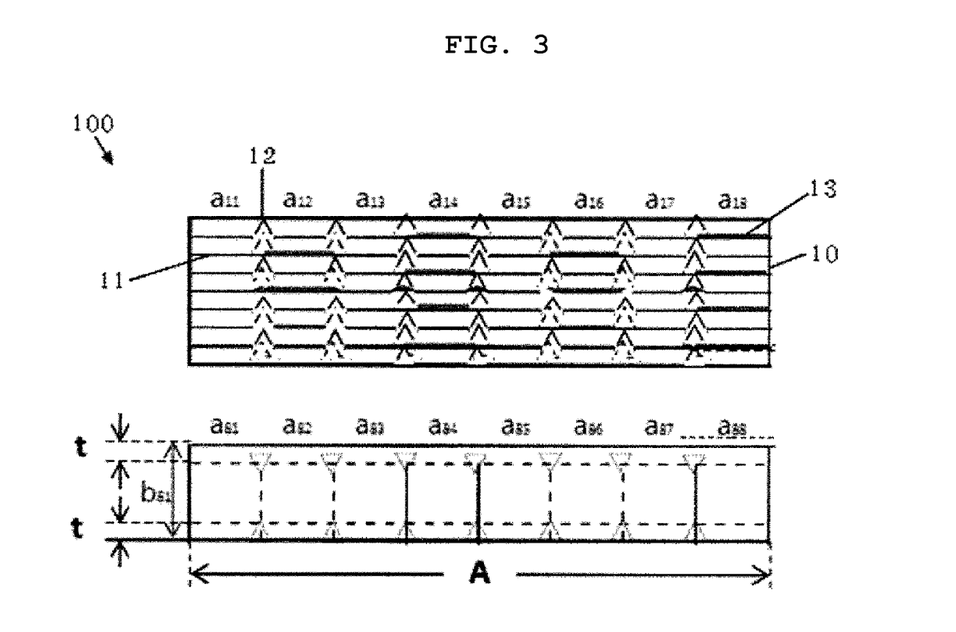
FIG. 3 is a cross-sectional view showing a foldable honeycomb structure according to the present disclosure in a state, in which the foldable honeycomb structure is folded in a longitudinal direction.

FIG. 3 is a view showing a state, in which the substrate formed in a foldable structure as shown in FIG. 2 is joined at positions to be joined and folded in the longitudinal direction.

Figure 4:
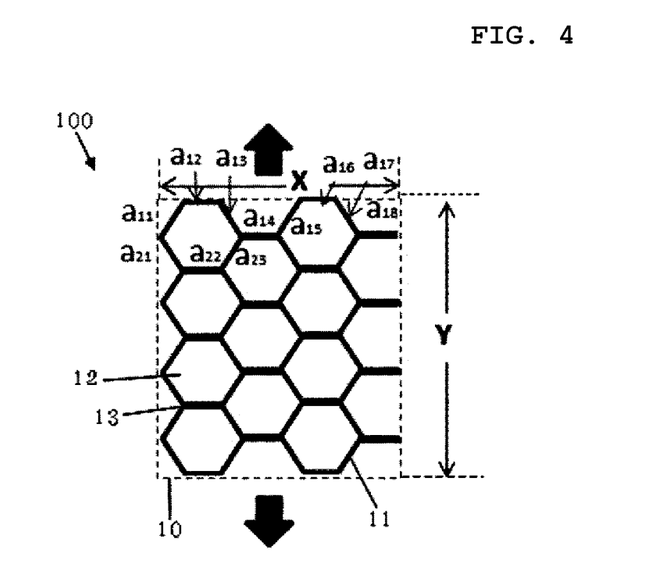
FIG. 4 is a cross-sectional view showing the foldable honeycomb structure according to the present disclosure in a state, in which the foldable honeycomb structure is unfolded in the longitudinal direction.

FIG. 4 is a view showing a state, in which the substrate folded in the longitudinal direction as shown in FIG. 3 is unfolded outwards in the longitudinal direction such that the honeycomb structure is formed.

As shown in FIG. 2 to FIG. 4, the substrate 10 is formed of: a film or a sheet of a rigid and easily foldable plastic material made of thermoplastic resin such as polypropylene, polyethylene, ABS, PET, vinyl chloride resin or thermosetting resin such as phenol resin, epoxy resin and polyurethane resin; or a film or a sheet of one material selected from paper, metal and non-metal (for example; a paper sheet, an aluminum sheet, a metal plate, a wooden plate), wherein the film or the sheet has a uniform thickness in the range of 0.1 to 3.0 mm and is pressed with concave and convex patterns (凹凸) on the surface and the rear surface thereof with a rolling mill such that the substrate can be readily folded or unfolded in the longitudinal direction. In addition, the substrate 10 can be formed of a film or a sheet having a uniform thickness in the range of 0.1 to 3.5 mm in accordance with circumstances.

The cut parts 11 are formed at predetermined intervals in the traverse arrangement on the substrate so as to form the honeycomb structure cell structure and includes first cut parts, which are provided in the boundary surface between traverse boundary surfaces b11 and b21 from the longitudinal boundary surfaces a11 to a13 and from the longitudinal boundary surfaces a15 to a17 in the traverse arrangement on the upper end of the substrate 10, and second cut parts, which are provided at the lower portions of the first cut parts in the boundary surface between traverse boundary surfaces b21 and b31 on the longitudinal boundary surface a11, from the longitudinal boundary surface a13 to longitudinal boundary surface a15 and from the longitudinal boundary surface a17 to the longitudinal boundary surface a18 in the traverse arrangement. Therefore, the plurality of cut parts 11 are provided for the longitudinal folding of the substrate with the first cut parts and second cut parts, which are repeatedly and alternately formed from traverse boundary surfaces b11 to b81 on the substrate in the longitudinal direction thereof.

In order to form the cross-sectional area and height of the honeycomb structure of the substrate 10, the hinge parts 12 include: surface hinge parts 121, which have boundary lines between traverse boundary surfaces b21 and b31, between traverse boundary surfaces b41 and b51 and between traverse boundary surfaces b61 and b71 on the surface of the substrate 10 in the longitudinal direction of the substrate and hinges having a thickness in the range of 0.05 to 0.3 mm of the longitudinal boundary surfaces a12 and a16 in the traverse direction of the substrate; and rear surface hinge parts 122, which have boundary lines between traverse boundary surfaces b11 and b21, between traverse boundary surfaces b31 and b41, between traverse boundary surfaces b51 and b61 and between traverse boundary surfaces b71 and b81 on the rear surface of the substrate 10 in the longitudinal direction of the substrate and hinges having a thickness in the range of 0.05 to 0.3 mm of the longitudinal boundary surfaces a14 and a18 in the traverse direction of the substrate. Therefore, when the substrate 10 is folded in the longitudinal direction, the hinge parts 12 having a thickness of 0.05 to 0.3 mm are configured such that the plurality of surface hinge parts 121 and the plurality of rear surface hinge parts 122 form the cross-sectional area and height of the hexagon-shaped honeycomb structure, and when the honeycomb structure is formed by the hinge parts 12, it is possible to generate the honeycomb structure in a folding manner, in which the substrate 10 is folded in the longitudinal direction and then unfolded. Thus, the hexagon-shaped honeycomb structure can be more readily formed with the hinge parts 12.

In addition, in accordance with circumstances, it is also possible to form the hinge parts 12 with the surface hinge parts 121 and the rear surface hinge parts 122 in the traverse direction of the substrate, which has the hinge thickness of 0.05 to 0.3 mm, or with either one selected from the surface hinge parts 121 and the rear surface hinge parts 122 in the traverse direction of the substrate.

The joint parts 13 include: surface joint parts 131, in which the longitudinal boundary surface a14, a18 are joined at the surfaces of traverse boundary surfaces b11 and b21, traverse boundary surfaces b31 and b41, traverse boundary surfaces b51 and b61, and traverse boundary surfaces b71 and b81 in the longitudinal direction of the substrate 10; and the rear surface joint parts 132, in which the longitudinal boundary surfaces a12, a16 are joined at the rear surfaces of the traverse boundary surfaces b21 and b31, the traverse boundary surfaces b41 and b51, and the traverse boundary surfaces b61 and b71 in the longitudinal direction of the substrate 10, wherein portions where bonding is required are joined on the surface and the rear surface of the substrate so as to form the three-dimensional honeycomb structure. Therefore, the joint parts 13 are configured such that the surface joint parts 131 and the rear surface joint parts 132 are repeatedly and alternately joined to the traverse boundary surfaces b11 to b81 in the longitudinal direction of the substrate. When the substrate 10 is folded in the longitudinal direction thereof, the joint parts 13 are configured to be joined by a method selected from fusion, adhesion, cohesion, high-frequency and ultrasonic methods and then carrying out pressing while folding the substrate such that the groove portions of the hinge parts 12 face outwards.

The reinforcement parts 14 for reinforcing the rigidity of the substrate 10 include; surface concave and convex parts 141 which are formed as the reinforcement parts for the traverse boundary surfaces b11, b31, b51, b71 in the shape of stripe-patterned concave and convex parts having a thickness of 2 to 5 mm in the longitudinal arrangement provided at a side on the surface of the substrate 10; and rear surface concave and convex parts 142 which are formed as the reinforcement parts for the traverse boundary surfaces b21, b41, b61, b81 in the shape of stripe-patterned concave and convex parts having a thickness of 2 to 5 mm in the longitudinal arrangement provided at a side on the rear surface of the substrate 10.

The thickness of the substrate 10 needs to be adjusted down to reduce weight and cost. However, since the rigidity is reduced when the thickness is adjusted to be reduced, the surface concave and convex parts 141 and the rear surface concave and convex parts 142 of the reinforcement parts 14 are formed in the shape of stripe-patterned concave and convex parts (凹凸) having a thickness of 2 to 5 mm in the longitudinal arrangement provided at a side on the surface and the rear surface of the substrate 10 for forming the hexagon-shape.

In addition, the foldable honeycomb structure 100 is configured such that the honeycomb structure in the above configuration is unfolded in a drawing direction so as to generate the hexagon-shaped honeycomb structure.

Figure 5:
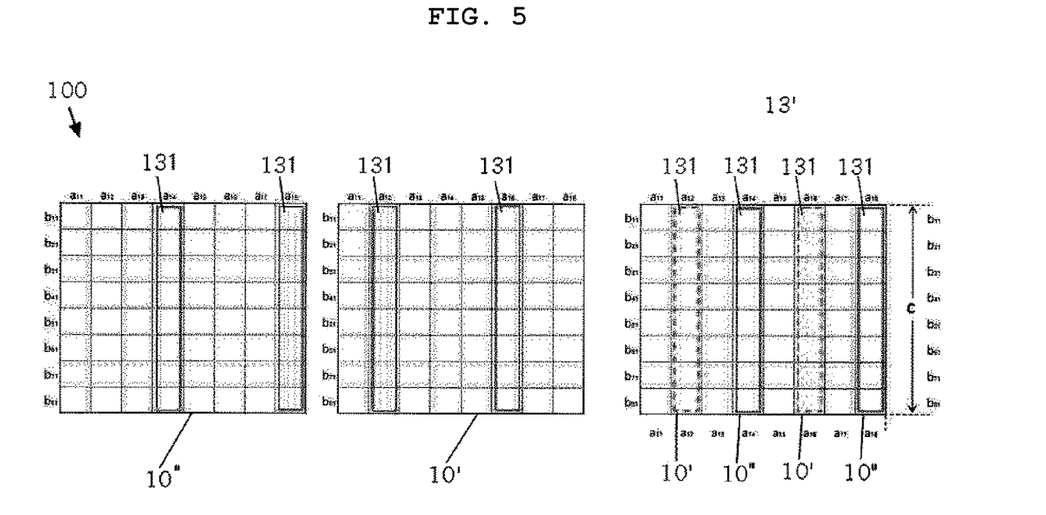
FIG. 5 to FIG. 7 are cross-sectional views respectively showing foldable honeycomb structures according to further embodiments of the present disclosure.

As shown in FIG. 5, in accordance with circumstances, the foldable honeycomb structure 100 of the present disclosure may include: a plurality of first and second substrates 10', 10" made of any one selected from plastic, paper, metal and non-metal materials; and joint parts 13' having the surface joint parts 131, which are formed continuously formed from the traverse boundary surfaces b11 to b81 on the first substrate 10' in the longitudinal direction thereof and replace the rear surface joint parts 132 of the joint parts 13, which are the joint parts of the longitudinal boundary surfaces a12 and a16 provided at the upper end of the rear surface of the substrate 10 as shown in FIG. 2, and surface joint parts 131, which are continuously formed from the traverse boundary surfaces b11 to b81 on the second substrate 10" in the longitudinal direction thereof and which are the joint parts of the longitudinal boundary surfaces a14 and a18 provided at the upper end of the surface of the substrate 10, wherein after the second substrate 10" is laminated on the first substrate 10' and then joined together, the both substrates are cut in direction b, which is to be the honeycomb structure height, and then laminated and joined so as to form the honeycomb structure as shown in FIG. 3, and then the hexagon-shaped honeycomb structure is formed by unfolding the same as shown in FIG. 4.

Figure 6:
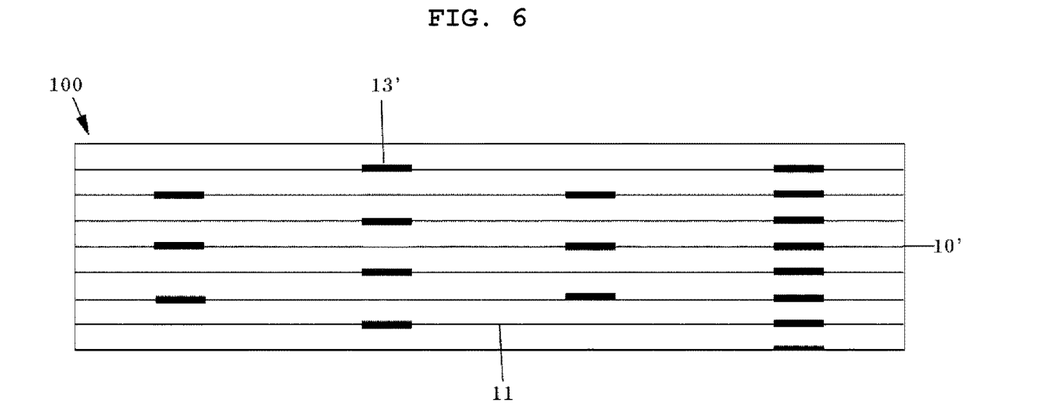
Figure 7:
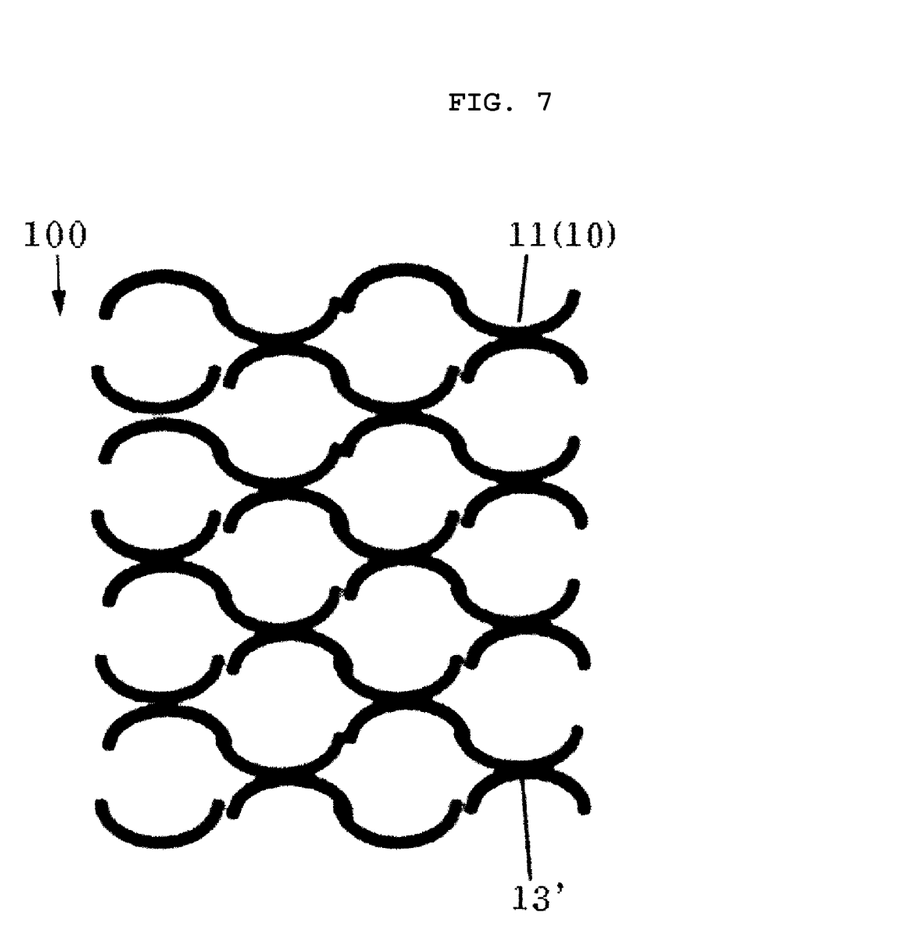

As shown in FIG. 6 and FIG. 7, in accordance with circumstances, the hinge parts 12 of the foldable honeycomb structure 100 of the present disclosure, may include: surface hinge parts 121 having only the hinges of the longitudinal boundary surface a12 and the longitudinal boundary surface a16 provided on the surface of the substrate in the traverse direction thereof; and rear surface hinge parts 122 having only the hinges of the longitudinal boundary surface a14 and the longitudinal boundary surface a18 provided on the rear surface of the substrate in the traverse direction thereof, wherein the hinge parts 12 exclude: the surface hinges of the surface hinge parts 121, which are the boundary lines of the traverse boundary surfaces b21 and b31, the traverse boundary surfaces b41 and b51, and the traverse boundary surfaces b61 and b71 provided on the surface of the substrate 10 in the longitudinal direction thereof; and the rear surface hinges of the rear surface hinge parts 122, which are the boundary lines of the traverse boundary surfaces b11 and b21, the traverse boundary surfaces b31 and b41, the traverse boundary surfaces b51 and b61, and the traverse boundary surfaces b71 and b81 provided on the rear surface of the substrate 10 in the longitudinal direction thereof.

Therefore, the foldable honeycomb structure 100 can be configured in the shape of waves, by including the substrate 10, cut parts 11, the traverse direction surface hinge parts 121 and the traverse direction rear surface hinge parts 122, the joint parts 13, and the reinforcement parts 14.

Further, the foldable honeycomb structure 100 can be configured in the shape of waves, by including the substrate 10, cut parts 11, the traverse direction surface hinge parts 121 and the traverse direction rear surface hinge parts 122 and the joint parts 13, while excluding the hinges in the longitudinal direction and the reinforcement parts 14.

The wave-shaped foldable honeycomb structure 100 includes a substrate 10 formed to be 0.1 to 0.6 mm higher than the actual production height of the honeycomb structure, which is twice the hinge thickness. After joining the joint parts, the height of the upper and lower portions of the honeycomb structure is removed by 0.05 to 0.3 mm, which is the actual thickness of the hinges, such that the cut parts are formed on the upper and lower portions. Therefore, the substrate 10 has a middle portion joined at the same height as the actual production height of the honeycomb structure. The substrate 10 is unfolded in the longitudinal direction, which is the drawing direction, such that the wave-shaped honeycomb structure is produced.

In addition, in accordance with circumstances, the foldable honeycomb structure 100 may include a functional material attached to the outside of the substrate 10 so as to reinforce sound absorption, rigidity, adhesion and hinge reinforcement: in order to impart sound absorbing function, the foldable honeycomb structure 100 may include a non-woven fabric or felt attached to one surface or both surfaces of the substrate 10; in order to further reinforce the rigidity, the foldable honeycomb structure 100 may include a glass fiber sheet or a glass fiber composite sheet attached to one surface or both surfaces of the substrate 10; or in order to reinforce the adhesion of the substrate or further enhancing the reinforcement with respect to the repetitive bending of the hinge parts, the foldable honeycomb structure 100 may include a single-layered or multi-layered film or sheet attached to one surface or both surfaces of the substrate 10.

It is also possible that the foldable honeycomb structure 100 includes the substrate 10, the cut parts 11, the hinge parts 12 and the joint parts 13, excluding the reinforcement parts 14.

Further, in order to improve the physical properties of the substrate 10, to recycle the substrate 10, or to promote the coloring of the substrate 10, the foldable honeycomb structure 100 may configured such that the substrate 10 is added with an organic filler mixed with one or more selected from wood powder, bamboo, hemp, rice hull, and cellulose, which are organic fillers, the substrate 10 is added with an inorganic filler mixed with one or more selected from talc, calcium carbonate or glass fiber, which are inorganic fillers, or the substrate 10 is added with a flame retardant or a pigment.

Besides, it is possible to form joint parts 13' such that the surface and the rear surface are alternately joined for the odd-numbered longitudinal boundary surfaces a11, a13, a15, a17 of the substrate 10 in the traverse direction thereof while the even-numbered longitudinal boundary surfaces a12, a14, a16, a18 are not jointed.

According to the foldable honeycomb structure 100 of the present disclosure configured as above has the technical features as follows.

Particularly, compared with the honeycomb structure produced by the prior art molding or extrusion method, by using the substrate 10 which is a rigid and easily foldable film or sheet made of a plastic, paper, metal, or non-metal material, it is possible to easily produce the honeycomb structure by a folding method, in which the substrate 10 is folded and unfolded, with remarkably increased productivity and workability.

Since the honeycomb structure 100 is produced by a folding method instead of the prior art molding or extrusion method, it is possible to variously change the hexagonal shape of the honeycomb structure by changing the length of drawing depending on use when unfolding the honeycomb structure 100. It is possible to produce thick honeycomb structure having a thickness of 3.0 mm or more. It is easy to transport and store the honeycomb structure 100, and the manufacturing cost and transportation cost thereof can be greatly reduced.

In the case where the honeycomb structure is used in large quantities or produced for a long period of time, it is possible to transport the honeycomb structure to a processing site in a folded state and then form the honeycomb structure shape in the site by unfolding the same, thereby further improving productivity and workability.

The foldable honeycomb structure can be produced by using a plastic resin material made of a thermoplastic resin material such as polypropylene, polyethylene, ABS, PET and vinyl chloride resin or a thermosetting resin material such as phenol resin, epoxy resin and polyurethane resin, or by using a composite resin material made by adding a functional material such as natural fiber or additives for reinforcing the functional physical properties such as rigidity, flame resistance, impact resistance and the like.

The foldable honeycomb structure 100 can be applied to various structures from a small/light load structure to a large/heavy load structure (for example, electric poles, large-scaled artificial wood structures and the like) by variously adjusting one side length "a" of the hinge, the height "b" of the hinge and the thickness "t" of the substrate in the hexagon-shaped honeycomb structure.

Hereinafter, a method for manufacturing a foldable honeycomb structure according to the present disclosure will now be described.

As shown in FIG. 8 (see FIG. 2 to FIG. 4 for the details of a foldable honeycomb structure product), a method for manufacturing a foldable honeycomb structure according to the present disclosure includes the following steps.

Step S1: a step for preparing a raw material mixture for forming a honeycomb structure substrate:

This is a step for preparing a raw material mixture for forming a honeycomb structure substrate by injecting into a mixer, one plastic resin material selected from a thermoplastic resin material such as polypropylene, polyethylene, ABS, PET and vinyl chloride resin, or a thermosetting resin material such as phenol resin, epoxy resin and polyurethane resin, an organic filler mixed with one or more selected from wood powder, bamboo, hemp, rice hull, and cellulose, an inorganic filler mixed with one or more selected from talc, calcium carbonate or glass fiber, a flame retardant and a pigment.

Step S2: a step for preparing a honeycomb structure substrate in the shape of a film or a sheet having a thickness of 0.1 to 3.0 mm by melt processing the raw material mixture for forming a honeycomb structure substrate:

This is a step for preparing a honeycomb structure substrate in the shape of a film or a sheet having a thickness of 0.1 to 3.0 mm by melt processing the raw material mixture for forming a honeycomb structure substrate in an extruding T-DIE or a calendar roll or a blow molding machine.

Step S3: a step for attaching a functional material such as a non-woven fabric or felt, a glass fiber sheet or a glass fiber composite sheet, or a film or a sheet onto one surface or both surfaces of the honeycomb structure substrate:

This is a step for attaching a functional material, which reinforces the sound absorbing function or rigidity of the substrate, adhesion of the substrate, or enhancing the reinforcement of hinges, such as a non-woven fabric or felt, a glass fiber sheet or a glass fiber composite sheet, or a single-layered or multi-layered film or sheet onto one surface or both surfaces of the honeycomb structure substrate by lamination or by means of an adhesive.

Step S4: a step for forming longitudinal hinge parts having a thickness of 0.05 to 0.3 mm on the surface and the rear surface of the honeycomb structure substrate by pressing the honeycomb structure substrate with a hinge roll provided with a longitudinal hinge:

This is the step for forming hinges having a hexagonal cross-sectional area, which are the longitudinal hinge parts having a thickness of 0.05 to 0.3 mm, on the surface and the rear surface of the honeycomb structure substrate prepared in step S2 or S3 by pressing the substrate with the hinge roll having an upper roll and a lower roll respectively provided with protruding lines, which are formed on the upper roll and the lower roll at the same interval as the length of one side of a honeycomb structure so as to form longitudinal hinges and of which every two lines are alternately provided on the upper roll and the lower roll and arranged in a circle.

Step S5: a step for forming traverse hinge parts having a thickness of 0.05 to 0.3 mm and cut parts by pressing the substrate, on which the longitudinal hinge parts having a thickness of 0.05 to 0.3 mm are formed, with a honeycomb structure height hinge producing roll:

This is a step for forming traverse hinge parts having a thickness of 0.05 to 0.3 mm and cut parts, of which every one line is alternately formed on the surface and the rear surface of the substrate, by pressing the substrate, on which the longitudinal hinge parts having a thickness of 0.05 to 0.3 mm are formed, with a honeycomb structure height hinge producing roll.

Step S6: a step for joining honeycomb structure joint parts by joining the upper portions of surface joint parts and rear surface joint parts on the surface and the rear surface of the substrate by a method selected from fusion, adhesion, cohesion, high-frequency and ultrasonic methods, while folding the honeycomb structure substrate in the longitudinal direction such that the groove portions of the hinges face outwards:

This is a step for joining honeycomb structure joint parts by joining the upper portions of surface joint parts on the surface of the substrate, which are the joint parts of the longitudinal boundary surfaces a14 and a18 provided on the upper end of the surface of the substrate, and the upper portions of rear surface joint parts on the rear surface of the substrate, which are the joint parts of the longitudinal boundary surfaces a12 and a16 provided on the upper end of the rear surface of the substrate, by a method selected from fusion, adhesion, cohesion, high-frequency and ultrasonic methods, while folding the honeycomb structure substrate in the longitudinal direction such that the groove portions of the hinges face outwards.

Step S7: a step for finishing a foldable honeycomb structure by cutting and laminating the honeycomb structure, which is joined at the honeycomb structure joint parts and folded in the longitudinal direction, into an appropriate size, and then drawing the same:

This is a step for finishing the manufacturing of a foldable honeycomb structure by cutting and laminating the honeycomb structure prepared by step S6, which is joined at the honeycomb structure joint parts and folded in the longitudinal direction, into an appropriate size according to use before drawing and shaping the honeycomb structure, and then transferring the same where necessary.

In addition, the longitudinal hinge parts of step S4 and the traverse hinge parts and the cut parts of step S5 are formed within the softening temperature range of the substrate before cooling.

As shown in FIG. 9, in accordance with circumstances, a method for manufacturing a foldable honeycomb structure according to the present disclosure may exclude step S4 for forming the longitudinal hinge parts so as to manufacture a foldable honeycomb structure in the shape of waves and thus may include step S1, step S2, step S3, step S5, step S6 and step S7 as mentioned above so as to manufacture a foldable honeycomb structure in the shape of waves, comprising the substrate, the traverse hinge parts, the cut parts, the joint parts, and the reinforcement parts as follows.

Step S1: the step for preparing the raw material mixture for forming a honeycomb structure substrate:

This is a step for preparing the raw material mixture for forming a honeycomb structure substrate by injecting into a mixer, one plastic resin material selected from a thermoplastic resin material such as polypropylene, polyethylene, ABS, PET and vinyl chloride resin, or a thermosetting resin material such as phenol resin, epoxy resin and polyurethane resin, an organic filler mixed with one or more selected from wood powder, bamboo, hemp, rice hull, and cellulose, an inorganic filler mixed with one or more selected from talc, calcium carbonate or glass fiber, a flame retardant and a pigment.

Step S2: the step for preparing a honeycomb structure substrate in the shape of a film or a sheet having a thickness of 0.1 to 3.0 mm by melt processing the raw material mixture for forming a honeycomb structure substrate:

This is the step for preparing a honeycomb structure substrate in the shape of a film or a sheet having a thickness of 0.1 to 3.0 mm by melt processing the raw material mixture for forming a honeycomb structure substrate in an extruding T-DIE or a calender roll or a blow molding machine.

Step S3: the step for attaching a functional material such as a non-woven fabric or felt, a glass fiber sheet or a glass fiber composite sheet, or a film or a sheet onto one surface or both surfaces of the honeycomb structure substrate:

This is the step for attaching a functional material, which reinforces the sound absorbing function or rigidity of the substrate, adhesion of the substrate, or enhancing the reinforcement of hinges, such as a non-woven fabric or felt, a glass fiber sheet or a glass fiber composite sheet, or a single-layered or multi-layered film or sheet onto one surface or both surfaces of the honeycomb structure substrate by lamination or by means of an adhesive.

Step S51: a step for forming traverse hinge parts, which are 0.1 to 0.6 mm higher than the actual honeycomb structure height, twice the hinge thickness, by pressing the honeycomb structure substrate with a honeycomb structure height hinge producing roll:

This is a step for forming traverse hinge parts, which are twice the hinge thickness and 0.1 to 0.6 mm higher than the actual height of the honeycomb structure, in which every one line is alternately formed on the surface and the rear surface of the substrate, by pressing the honeycomb structure substrate with a honeycomb structure height hinge producing roll.

Step S61: a step for producing a honeycomb structure, in which a middle portion is joined at the same height as the actual production height of the honeycomb structure and cut parts are provided, by joining honeycomb structure joint parts by joining the upper portions of surface joint parts and rear surface joint parts on the surface and the rear surface of the substrate by a method selected from fusion, adhesion, cohesion, high-frequency and ultrasonic methods, while folding the honeycomb structure substrate in the longitudinal direction, and then removing the height formed on the upper and lower portions of the substrate by 0.05 to 0.3 mm:

Step S71: a step for finishing a foldable wave-shaped honeycomb structure by cutting and laminating the honeycomb structure into an appropriate size, and then drawing the same:

This is a step for finishing the manufacturing of a foldable wave-shaped honeycomb structure by cutting and laminating the honeycomb structure prepared by step S61 into an appropriate size according to use before drawing and shaping the honeycomb structure, and then transferring the same where necessary.

In the steps S51 and S61, the hinge parts are formed for hinges, which are 0.1 to 0.6 mm higher than the actual honeycomb structure height, twice the hinge thickness.

The wave-shaped honeycomb structure is formed in such a manner that the odd numbered longitudinal boundary surfaces a11, a13, a15, a17 in the traverse direction of the substrate 10 are not joined, folding is carried out while the longitudinal boundary surfaces a14 and a18, which are even numbered surfaces, and the longitudinal boundary surfaces a12 and a16, which are even numbered rear surfaces, are alternately joined, the height of the hinges formed on the upper and lower portions of the honeycomb structure is removed by 0.05 to 0.3 mm to the actual hinge thickness such that the substrate is produced with the middle portion joined at the same height as the actual production height of the honeycomb structure, and then the substrate with the joined middle portion is unfolded in the longitudinal direction.

In order to reduce the weight of the honeycomb structure substrate and to save the cost, the thickness of the substrate should be adjusted downwards. In this case, however, the problem that the rigidity is lowered occurs.

Therefore, in accordance with circumstances, the method for manufacturing a foldable honeycomb structure according to the present disclosure may include forming, as reinforcement parts, surface concave and convex parts and rear surface concave and convex parts in the shape of stripe-patterned concave and convex parts (┌┤┌┤) having a thickness of 2 to 5 mm in the longitudinal arrangement provided at a side on the surface and the rear surface of the honeycomb structure substrate produced in step S2.

The surface concave and convex parts and the rear surface concave and convex parts are formed so that they are not interfered with each other when the substrate is folded in the longitudinal direction.

Further, according to the method for manufacturing a foldable honeycomb structure of the present disclosure, the substrate of step S1 may be formed of any one material selected from paper, metal or non-metal materials (for example, paper, aluminum, a metal plate, a wooden material), which is rigid and easily foldable, instead of a plastic material.

In addition, if the honeycomb structure of the same size is to be manufactured in large quantities, it is possible to form the cut parts and the hinge parts of step S4 or step S5 or step S51 by preparing a mold for forming the hinges and the cut parts and pressing the same with a flat plate press, or by using ultrasonic waves.

Further, it is also possible to form the hinge parts only and then form the cut parts by cutting, sanding or melting the upper and lower portions of the hinge parts after folding the hinge parts in the longitudinal direction, or form the hinge parts and the cut parts by CNC or laser processing.

Further, according to the method for manufacturing a foldable honeycomb structure of the present disclosure, it is also possible to purchase a commercially available film or sheet and use the same as the substrate, wherein steps S3 to S7 or steps S3 to S71 are applied.

In the case where a thick board having a thickness of 3.1 to 20 mm is used as a substrate, after the substrate is preheated, the substrate is pressed with a press, which is provided with a mold having cut parts and hinge parts, and then cooled such that the longitudinal hinges constituting the hexagon-shaped cross-sectional area and the traverse hinge constituting the side height are formed.

In addition, according to the method for manufacturing a foldable honeycomb structure of the present disclosure, the substrate is formed of any one material selected from plastic such as thermoplastic resin or thermosetting resin, paper, metal and non-metal and has the shape of a film or a sheet having a thickness of 0.1 to 3.0 mm, is not provided with hinges, and is folded to the same length twice as large as the substrate thickness than the actual production height of the honeycomb structure. During the folding, the odd numbered surfaces are joined at a predetermined joint interval and the even numbered surfaces are joined such that the even numbered surface joints are positioned in the center of the joint interval of the odd numbered surfaces. After that, the height of the upper and lower portions of the honeycomb structure is removed by the real thickness of the substrate such that the honeycomb structure is produced, in which a middle portion is joined at the same height as the actual production height of the honeycomb structure and cut parts are provided. A three-dimensional honeycomb structure is produced by unfolding the honeycomb structure, in which the middle portion is joined and the cut parts are provided, in the longitudinal direction.

Further, according to the method for manufacturing a foldable honeycomb structure of the present disclosure (see FIG. 5 for the details of a foldable honeycomb structure product), the rear surface joint parts 132 of the joint parts 13 shown in FIG. 2, which are the joint parts of the longitudinal boundary surface a12 and the longitudinal boundary surface a16 provided on the upper end of the substrate, are continuously formed on traverse boundary surfaces b11 to b81 of the substrate surface longitudinal direction of the first substrate 10', and the surface joint part 131 of the joint parts 13 shown in FIG. 2, which are the joint parts of the longitudinal boundary surface a14 and the longitudinal boundary surface a18 provided on the upper end of the substrate, are continuously formed on traverse boundary surfaces b11 to b81 of the substrate surface longitudinal direction of the second substrate 10". After the second substrate 10" is laminated on the first substrate 10' and then joined together, the both substrates are cut in direction b, which is to be the honeycomb structure height, and then laminated and joined so as to form the honeycomb structure as shown in FIG. 3, and then the hexagon-shaped honeycomb structure may be formed by unfolding the same outwards (in the longitudinal direction).

According to the method for manufacturing a foldable honeycomb structure 100 of the present disclosure in the above configuration, particularly, compared with the honeycomb structure produced by the prior art molding or extrusion method, by using the substrate, which is a rigid and easily foldable film or sheet made of a plastic, paper, metal, or non-metal material, it is possible to easily produce the honeycomb structure by a folding method, in which the substrate is folded and unfolded, with remarkably increased productivity and workability.

Since the honeycomb structure 100 is produced by a folding method instead of the prior art molding or extrusion method, it is possible to variously change the hexagonal shape of the honeycomb structure by changing the length of drawing depending on use when unfolding the honeycomb structure 100. It is possible to produce thick honeycomb structure having a thickness of 3.0 mm or more.

It is easy to transport and store the honeycomb structure, and the manufacturing cost and transportation cost thereof can be greatly reduced.

In the case where the honeycomb structure is used in large quantities or produced for a long period of time, it is possible to transport the honeycomb structure to a processing site in a folded state and then form the honeycomb structure shape in the site by unfolding the same, thereby further improving productivity and workability.

According to the method for manufacturing the foldable honeycomb structure, it is possible to produce the foldable honeycomb structure by using a plastic resin material made of a thermoplastic resin material such as polypropylene, polyethylene, ABS, PET and vinyl chloride resin or a thermosetting resin material such as phenol resin, epoxy resin and polyurethane resin, or by using a composite resin material made by adding a functional material such as natural fiber or additives for reinforcing the functional physical properties such as rigidity, flame resistance, impact resistance and the like.

In addition, it is possible to readily adjust the honeycomb structure cell height during the mass production of the honeycomb structure.

It is also possible to form the cut parts and the hinge parts with a commercially available film or sheet by using a press and a mold, by using a flat plate press, or by using high frequencies or ultrasonic waves.

Further, it is also possible to form both the cut parts and the hinge parts in the traverse direction through step S4 or step S5. It is also possible to form only the hinge parts of step S51, and then form the cut parts by cutting, sanding or melting the upper and lower portions of the hinge parts after folding the hinge parts in the longitudinal direction. It is also possible to form both the cut parts and the hinge parts by CNC or laser processing.

According to the method for manufacturing the foldable honeycomb structure, it is possible to apply the foldable honeycomb structure to various structures from a small/light load structure to a large/heavy load structure (for example, electric poles, large-scaled artificial wood structures and the like) by variously adjusting one side length "a" of the hinge, the height "b" of the hinge and the thickness "t" of the substrate.

Meanwhile, in the case where the cut parts or the hinge parts are formed at a softening temperature of the substrate (for example, 150 to 160° C. for polypropylene), it is difficult to form the cut parts or the hinge parts due to the high temperature. The cut parts or the hinge parts can be easily formed within the temperature range of 50 to 85% of the substrate softening temperature.

INDUSTRIAL APPLICABILITY

According to the foldable honeycomb structure and the manufacturing method thereof according to the features of the present disclosure, the following effect can be expected, compared with the honeycomb structure produced by the prior art molding or extrusion method.

It is possible to easily produce the honeycomb structure by a folding method, in which a film or a sheet is folded and unfolded, with remarkably increased productivity and workability.

It is easy to transport and store the honeycomb structure, and the manufacturing cost and transportation cost thereof can be greatly reduced.

It is possible to produce thick honeycomb structure having a thickness of 3.0 mm or more.

It is possible to produce the foldable honeycomb structure by using a plastic resin material made of a thermoplastic resin material such as polypropylene, polyethylene, ABS, PET and vinyl chloride resin or a thermosetting resin material such as phenol resin, epoxy resin and polyurethane resin, or by using a composite resin material made by adding a functional material such as natural fiber or additives for reinforcing the functional physical properties such as rigidity, flame resistance, impact resistance and the like.

It is possible to variously change the hexagonal shape of the honeycomb structure by changing the length of drawing depending on use when unfolding the honeycomb structure.

It is possible to readily adjust the honeycomb structure cell height during the mass production of the honeycomb structure, and simply manufacture the foldable honeycomb structure by using a commercially available film or sheet by using simple equipment and a mold or by CNC processing.

The invention claimed is:

1. A foldable honeycomb structure (100) used as a building material, an automotive material, an industrial material, or a gardening material, comprising:
   a substrate (10) formed of one selected from plastic, paper, metal, or non-metal materials;
   cut parts (11) formed at regular intervals in a transverse arrangement on the substrate (10) so as to form a honeycomb cell structure of the substrate (10), wherein the honeycomb cell structure is formed as the substrate (10) is unfolded in a longitudinal direction and then unfolded;
   hinge parts (12) provided on a surface of the substrate (10) and on a rear surface of the substrate (10), each including a surface hinge part (121) and a rear surface hinge part (122), which are composed of a transverse hinge for folding the substrate (10) in the longitudinal direction and a longitudinal hinge for forming a cross-sectional area of the honeycomb structure (100);
   joint parts (13) including a surface joint part (131) and a rear surface joint part (132); and
   reinforcement parts (14) including a surface concave and convex parts (141) and rear surface concave and convex parts (142), which are respectively provided on the surface of the substrate (10) and on the rear surface of the substrate (10) so as to be joined to portions where the surface of the substrate (10) and the rear surface of substrate (10) are required,
   wherein the cut parts (11) include:
      first cut parts, which are provided in a boundary surface between transverse boundary surfaces (b11) and (b21) from a longitudinal boundary surface (a11) to a longitudinal boundary surface (a13) and from a longitudinal boundary surface (a15) to a longitudinal boundary surface (a17) in the transverse arrangement on an upper end of the substrate (10); and
      second cut parts, which are provided at lower portions of first cut parts in the boundary surface between the transverse boundary surface (b21) and a transverse boundary surface (b31) on the longitudinal boundary surface (a11), from the longitudinal boundary surface (a13) to the longitudinal boundary surface (a15) and from the longitudinal boundary surface (a17) to a longitudinal boundary surface (a18) in the transverse arrangement, wherein the first cut parts and the second cut parts are repeatedly and alternately formed from the transverse boundary surface (b11) to a transverse boundary surface (b81) on the substrate (10) in the longitudinal direction thereof.

2. The foldable honeycomb structure (100) according to claim 1, wherein the hinge parts (12) include:

surface hinge parts (121), which have boundary lines between the transverse boundary surfaces (b21 and b31), between transverse boundary surfaces (b41 and b51) and between transverse boundary surfaces (b61 and b71) on the surface of the substrate (10) in the longitudinal direction of the substrate and hinges of longitudinal boundary surfaces (a12 and a16) in the transverse direction of the substrate (10); and rear surface hinge parts (122), which have boundary lines between transverse boundary surfaces (b11 and b21), between the transverse boundary surfaces (b31 and b41), between the transverse boundary surfaces (b51 and b61) and between the transverse boundary surfaces (b71 and b81) on the rear surface of the substrate (10) in the longitudinal direction of the substrate (10) and hinges of longitudinal boundary surfaces (a14 and a18) in the transverse direction of the substrate (10).

3. The foldable honeycomb structure (100) according to claim 2, wherein the surface hinge parts (121) and the rear surface hinge parts (122) of the hinge parts (12) in the transverse direction of the substrate include:

the surface hinge parts (121) and the rear surface hinge parts (122) having a thickness in the range of 0.05 to 0.3 mm in the transverse direction of the substrate; or either one hinge parts selected from the surface hinge parts (121) and the rear surface hinge parts (122) of the hinge parts (12) in the transverse direction of the substrate, wherein both the surface hinge parts (121) and the rear surface hinge parts (122) are formed on the surface of the substrate (10), or both the surface hinge parts (121) and the rear surface hinge parts (122) are formed on the rear surface of the substrate (10).

4. The foldable honeycomb structure (100) according to claim 1, wherein joint parts (13) include:

surface joint parts (131), in which the longitudinal boundary surface (a14) and the longitudinal boundary surface (a18) are joined at the surfaces of the transverse boundary surfaces (b11 and b21), the transverse boundary surfaces (b31 and b41), the transverse boundary surfaces (b51 and b61), and the transverse boundary surfaces (b71 and b81) in the longitudinal direction of the substrate (10); and the rear surface joint parts (132), in which the longitudinal boundary surface (a12) and the longitudinal boundary surface (a16) are joined at the rear surfaces of the transverse boundary surfaces (b21 and b31), the transverse boundary surfaces (b41 and b51), and the transverse boundary surfaces (b61 and b71) in the longitudinal direction of the substrate (10), wherein the surface joint parts (131) and the rear surface joint parts (132) are repeatedly and alternately joined to the transverse boundary surfaces (b11 to b81) in the longitudinal direction of the substrate.

5. The foldable honeycomb structure (100) according to claim 1, wherein the reinforcement parts (14) include:

surface concave and convex parts (141), which are formed as the reinforcement parts for the transverse boundary surfaces (b11, b31, b51, b71) in the shape of stripe-patterned concave and convex parts having a thickness of 2 to 5 mm in the longitudinal arrangement provided at a side surface on the surface of the substrate (10); and rear surface concave and convex parts (142), which are formed as the reinforcement parts for the transverse boundary surfaces (b21, b41, b61, b81) in the shape of stripe-patterned concave and convex parts having a thickness of 2 to 5 mm in the longitudinal arrangement provided at a side surface on the rear surface of the substrate (10).

6. The foldable honeycomb structure (100) according to claim 1, wherein the substrate (10) is formed to be 0.1 to 0.6 mm higher than the actual production height of the honeycomb structure (100), which is twice the hinge thickness, the height of the upper and lower portions of the honeycomb structure (100) is removed, after joining the joint parts, by 0.05 to 0.3 mm, which is the actual thickness of the hinges, such that the cut parts are formed on the upper and lower portions, and the substrate (10) has a middle portion joined at the same height as the actual production height of the honeycomb structure (100).

7. The foldable honeycomb structure (100) according to claim 1, wherein the joint part (13) is formed such that the surface and the rear surface are alternately joined for the odd-numbered longitudinal boundary surfaces (a11, a13, a15, a11) of the substrate (10) in the transverse direction thereof while the even-numbered longitudinal boundary surfaces (a12, a14, a16, al8) are not joined.

8. The foldable honeycomb structure (100) according to claim 1, further comprising:

first and second substrates (10', 10") made of any one selected from plastic, paper, metal and non-metal materials; and joint parts (13') having surface joint parts (131), which are the joint parts (13') of longitudinal boundary surfaces (a12 and al6) provided at an upper end of a rear surface of the first substrate (10'), so as to be continuously formed from transverse boundary surfaces (b11 to b81) of the first substrate (10') in the longitudinal direction thereof, and the surface joint parts (131), which are the joint parts (13') of longitudinal boundary surfaces (a14 and al8) provided at an upper end of a surface of the second substrate (10"), so as to be continuously formed from the transverse boundary surfaces (b11 to b81) of the second substrate (10") in the longitudinal direction thereof, wherein after the second substrate (10") is laminated on the first substrate (10') and then joined together, the first and second substrates (10', 10") are cut into a length (b) in the longitudinal direction of the honeycomb structure (100) and then laminated and joined.

9. The foldable honeycomb structure (100) according to claim 8, wherein the first substrate (10') is a plurality of the first substrate (10'), and wherein the second substrate (10") is a plurality of the second substrate (10").

* * * * *